United States Patent [19]
Hayashi et al.

[11] Patent Number: 6,160,544
[45] Date of Patent: Dec. 12, 2000

[54] DIGITAL VIDEO DISTRIBUTION SYSTEM

[75] Inventors: Toshinari Hayashi, Tokyo; Junzo Okunaka, Funabashi, both of Japan

[73] Assignees: Tokyo Broadcasting System, Inc.; NTT Electronics Corporation, both of Tokyo, Japan

[21] Appl. No.: 08/967,978

[22] Filed: Nov. 12, 1997

[30] Foreign Application Priority Data

May 12, 1997 [JP] Japan ................................ 9-137773

[51] Int. Cl.[7] .............................. H04N 7/10; H04N 7/14; H04N 1/100
[52] U.S. Cl. ..................... 345/327; 455/3.1; 455/5.1; 348/12; 348/13
[58] Field of Search ............................ 345/327; 455/3.1, 455/5.1, 6.1; 348/12, 13, 10, 8, 6; H04N 7/10, 7/14, 1/00

[56] References Cited

U.S. PATENT DOCUMENTS

| | | | |
|---|---|---|---|
| 5,412,720 | 5/1995 | Hoarty | 348/13 |
| 5,587,734 | 12/1996 | Lauder et al. | 348/12 |
| 5,594,490 | 1/1997 | Dawson et al. | 348/12 |
| 5,699,107 | 12/1997 | Lawler et al. | 348/12 |
| 5,745,837 | 4/1998 | Fuhrmann | 348/12 |
| 5,752,003 | 5/1998 | Hart | 395/200.01 |
| 5,756,280 | 5/1998 | Soora et al. | 348/12 |
| 5,768,539 | 6/1998 | Metz et al. | 455/3.1 |

OTHER PUBLICATIONS

Hayashi et al, Preprint of Commercial Broadcasting Technical Report No. 33, 1996; Published on Nov. 13, 1996.

Hayashi, Broadcasting Technique, Published Jan. 1, 1997.

*Primary Examiner*—Nathan Flynn
*Assistant Examiner*—Vivek Srivastava
*Attorney, Agent, or Firm*—Pilsbury Madison & Sutro LLP; Intellectual Property Group

[57] ABSTRACT

A digital video distribution system is disclosed which includes video terminals connected within a LAN and distributes video from a certain terminal to destination terminals, simultaneously. In this system, each transmitter terminal has an encoder that converts analog video information from a corresponding video source to digitally compressed video information. A hub are connected to the video terminals to distribute digitally compressed video information from a transmitter terminal to multiple destination (receiver) terminals in accordance with a multicast communication protocol. Each of the receiver terminals has an address filter for selecting a packet from among multicast communication packets that has a desired source address as valid video information. The receiver further has a decoder for converting digitally encoded information received as valid to original analog video information with expansion.

44 Claims, 8 Drawing Sheets

DIGITAL VIDEO DISTRIBUTION SYSTEM

BACKGROUND OF THE INVENTION

The present invention relates to a digital video system for distributing analog video signals from multiple video sources, such as cameras, VCRs or the like, to multiple video receiver terminals in the form of digital video information.

This application is based on Japanese Patent Application No. 9-137773, filed May 12, 1997, the content of which is incorporated herein by reference.

In TV broadcast stations, a video distribution system is used which distributes simultaneously analog video signals from multiple TV cameras to multiple monitors. Depending on circumstances, these monitors may be distributed over multiple studios. A director chooses video information to be broadcast while watching the monitor screens. In this specification, unless otherwise specified, video is defined as containing audio.

In FIG. 1, there is illustrated a schematic of a conventional video distribution system, which is equipped, as video sources, with multiple cameras $10_1$ to $10_m$ each with a motor-driven universal head, a motor-driven focusing/zooming mechanism, and a microphone. These cameras are unmanned ones that are installed on the roof of a building or the like. An analog video signal from each of the cameras $10_1$ to $10_m$ is supplied over a video channel 12 to a corresponding one of video distributors $14_1$ to $14_m$, each of which then distributes the analog video signal of the corresponding respective camera to first and second routing switchers 16 and 18. Each of the first and second routing switchers 16 and 18 is a unidirectional analog routing switcher. The first switcher 16 has two separate matrix switches: one for video signals and one for audio signals, whereas the second switcher 18 has three separate matrix switches: one for video from camera to monitor, one for audio from camera to monitor, and one for control signals from monitor to camera. A video signal and a audio signal are each transferred over the corresponding switch. The first routing switcher 16, which is adapted for video broadcasting device, couples one of its several inputs to its single output. A single analog video signal thus selected from multiple analog video signals is supplied to a broadcasting device 20.

The second routing switcher 18, which is adapted to distribute video signals to monitors $22_1$ to $22_n$ installed in a studio, selectively couples its inputs to its outputs. In response to a select signal from each of the monitors, the second routing switcher 18 sends a desired video signal to that monitor. In this case, a certain video signal may be supplied simultaneously to the monitors $22_1$ to $22_n$. Each of the monitors is equipped with a loudspeaker and a remote controller for controlling the panning, focusing, zooming or the like of a camera that is shooting a picture being displayed from the monitor side. The control signals from the remote controllers of the monitors are supplied over the control signal matrix switch in the second routing switcher 18 and a control channel 24 to the universal heads and the focusing/zooming mechanisms of the cameras $10_1$ to $10_m$.

With this conventional system, users can operate the second routing switcher 18 to switch among video signals for each of the monitors $22_1$ to $22_n$ and, while watching the monitor screens, can operate the remote controller to control the universal heads and focusing/zooming mechanisms of the cameras from the monitor side so as to adjust camera angle, focusing, and angle of view.

However, the conventional system divides one video signal into two: one for broadcasting and one for monitoring. In addition, a separate matrix switch is required for each of video and audio signals. Thus, large-scale wiring facilities are needed. To install more cameras and monitors, therefore, it is required to add routing switchers or their ingredients, matrix switches, and wirings to accommodate additional signals. For renewal, the system has to be shut down for a long time and a great cost is involved.

Moreover, each of the routing switchers is unidirectional. Thus, the transfer of control signals from monitors to cameras cannot be made over the same routing switch and lines as video or audio signals. The use of separate wirings for control signals increases the scale and cost of the system.

On the other hand, one method of distributing video signals to multiple monitors is coaxial cable-based broadcasting (CATV). With this system, it is relatively easy to increase the number of monitors, but it is difficult to install more cameras as with the conventional system described in connection with FIG. 1. In addition, the system is also basically unidirectional. The transmission of control signals from monitors to cameras thus requires separate wiring facilities, increasing the system scale and cost.

Furthermore, one system that has a feature of distributing data to multiple terminals is a computer-based LAN (Local Area Network). It will be expected to transfer video signals over the IEEE 802.3 LAN that is now widely used. However, this LAN is a band sharing type of communications system that employs carrier sense, multiple access, collision detection (CSMA/CD) techniques. When a collision is detected at the time when a data transmission is made, the transmission is stopped, and a retransmission is made at a later time. If an attempt is made to simultaneously transmit video signals from multiple locations, other signals than one will undergo delays. This will cause disturbances in pictures displayed on monitors. That is, video transmissions require so strict real-time integrity as not to cause transmission delays and frame rate variations during transmission. The time interval between the moment that one frame of picture information arrived and the moment that the next frame of picture information arrives depends on the number of frames per unit time of original picture information. If the number of frames is not retained, reproduced pictures will suffer from loss of picture quality. That is, unlike data transmission LANs which have some tolerance in real-time integrity, video-oriented LANs require very reliable time management; otherwise, picture quality may suffer considerably. If, when the users adjust camera angles and angles of view while watching the monitor screens, responses from the cameras are delayed, they will have difficulty in the adjustment work.

In addition, since the conventional LANs use optical cables, hardware cost is increased significantly and difficulties are involved in installing the cables.

BRIEF SUMMARY OF THE INVENTION

It is therefore an object of the present invention to provide a bidirectional digital video distribution system which is adaptable for system expansion and ensures real-time integrity of moving pictures.

It is another object of the present invention to provide a digital video distribution system which is built at a low cost and allows operational maintenance costs as needed to change the place where it is installed to be small.

According to the present invention, there is provided a digital video distribution system for distributing analog video information of any one of multiple video sources to multiple video display units, comprising: a plurality of first terminals connected to the video sources, each of the first terminals comprising an encoder for converting analog video information to digital video information with compression and an interface for outputting the digital video information in the form of multicast protocol-based packets; a LAN connected to the first terminals; and a plurality of second terminals connected to the LAN and to the display units, each of the second terminals comprising an interface for receiving desired packets from the LAN and a decoder for converting the packets from the interface to analog video information with expansion (decompression), the resulting analog video information being displayed on the corresponding display unit.

According to this digital video distribution system, analog video information is converted to digital video information in each of the transmitter (first) terminals, the digital video information from each transmitter terminal is send to all the receiver (second) terminals over the LAN in accordance with a multicast communication protocol, and, in each receiver terminal, desired digital video information is selectively received and converted to original analog video information. Thus, a bidirectional digital video distribution system can be provided which has great flexibility in installing more terminals and does not cause real-time integrity of moving pictures to suffer. In addition, less cost is required to implement the system and to change the place where the system is installed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a digital video distribution system apparatus according to the present invention will now be described with reference to the accompanying drawings.

Figure 1:
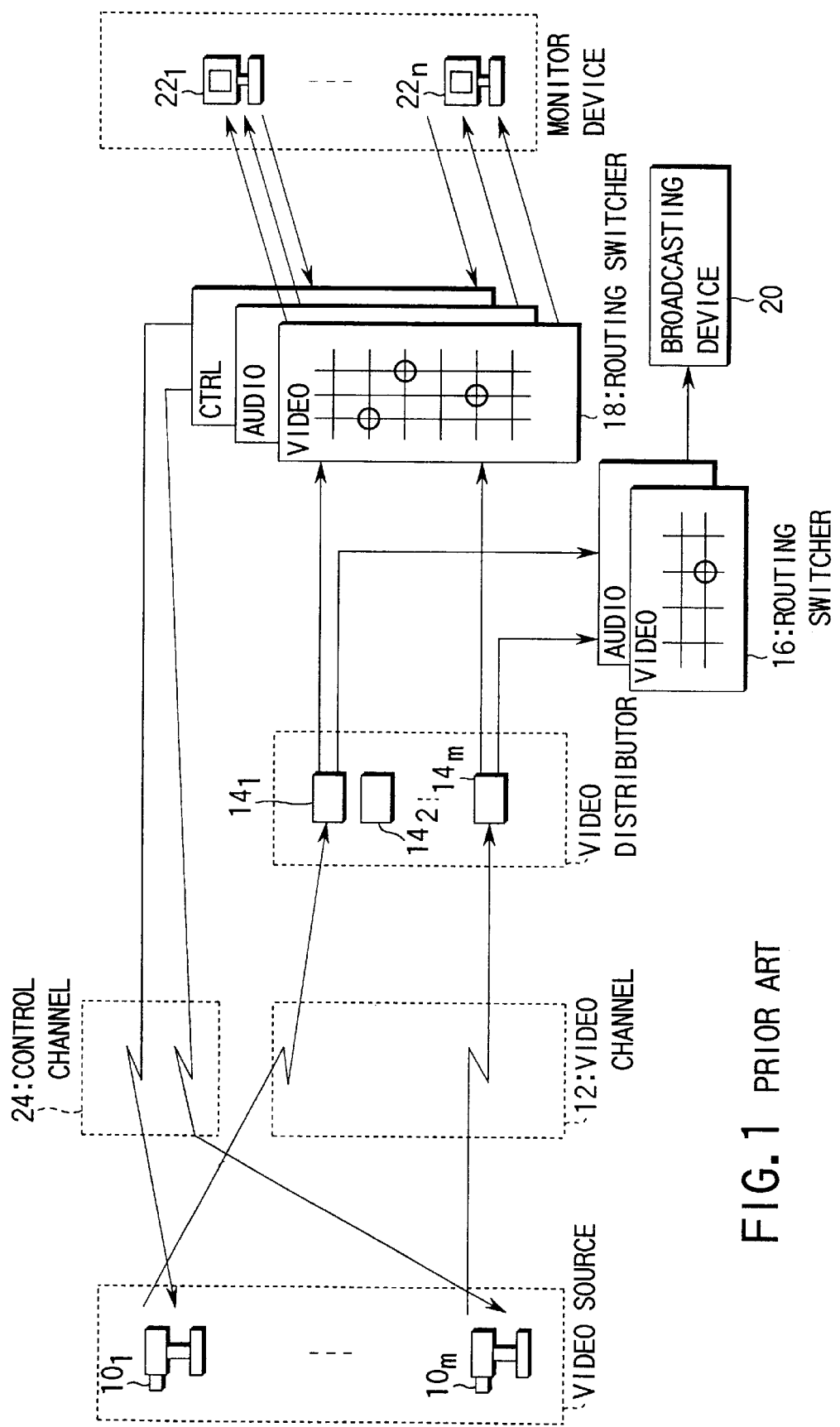
FIG. 1 is a block diagram of a conventional video distribution system.
Figure 2:
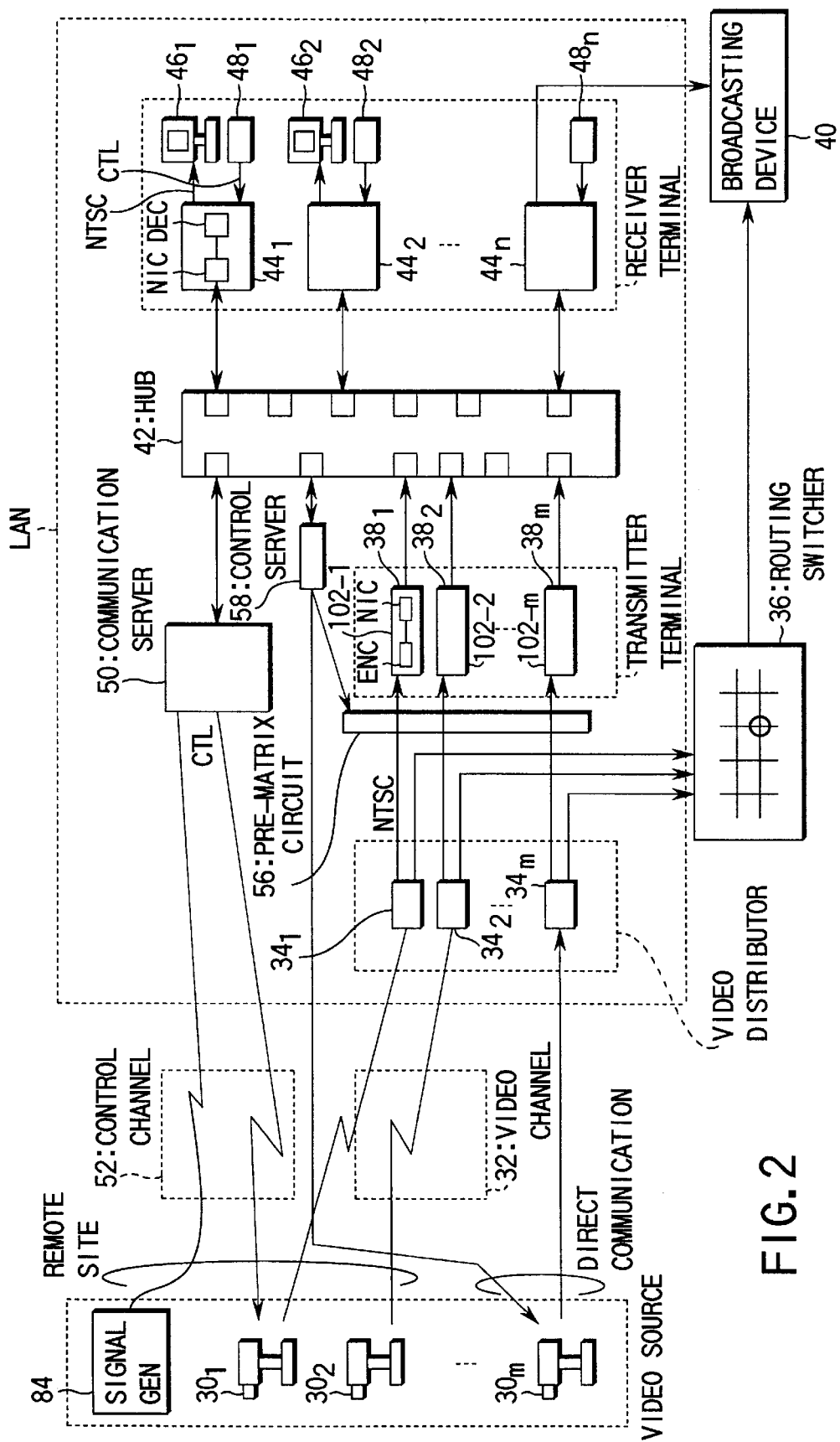
FIG. 2 is a block diagram of a first embodiment of a digital video distribution system in accordance with the present invention.

Referring now to FIG. 2, there is illustrated in block diagram form an arrangement of a first embodiment of a digital video distribution system in accordance with the present invention. The first embodiment is an example of a digital video distribution system in which video (moving picture) signals from cameras are carried over an in-TV broadcasting station computer-based LAN (IEEE 802.12 demand priority LAN, alias 100VG Any-LAN (100 Mbps Voice Grade-Any LAN)) in the form of digital video information.

As video sources, there are installed a plurality of cameras $30_1$ to $30_m$ each with an electrically-operated universal head and electrically-controlled focusing/zooming mechanisms. These are unmanned cameras that are placed on the roof of a building or buildings or the like and have microphones. The cameras may be placed in the proximity of the LAN so that they can be directly connected to the LAN or at remote locations. Analog video signals (containing audio signals picked up by the microphones) from the cameras that are located within the area covered by the LAN are directly supplied to video distributors $34_1$ to $34_m$. On the other hand, analog video signals from the cameras that are placed at remote locations are supplied to the video distributors $34_1$ to $34_m$ over video channels 32. To accommodate the real-time integrity requirements of video information, the video channels 32 are formed of very high speed dedicated TV channels or microwave channels.

Each of the video distributors $34_1$ to $34_m$ distributes an analog video signal from a corresponding one of the cameras $30_1$ to $30_m$ to a broadcasting routing switcher 36 and a corresponding one of transmitter terminals $38_1$ to $38_m$ in synchronism with sync signals used in the broadcasting station. Like the conventional routing switcher, the routing switcher 36 is a unidirectional analog routing switcher which has two separate matrix switches for video and audio and selectively couples any one of its several inputs to its single output. An analog video signal selected is supplied to a broadcasting device 40. The flow of signals for broadcasting is the same as that in the conventional system.

Each of the terminals $38_1$ to $38_m$, which are computers used as general LAN terminals, has a video encoder (hereinafter abbreviated to ENC) and a network interface card (hereinafter abbreviated to NIC). An analog video signal from each of the video distributors is supplied to the video encoder ENC in a corresponding one of the terminals with in-station synchronization maintained. The video encoder ENC digitizes an analog video signal with information compression. The resulting digital video information is assembled into multicast communication protocol-based packets by the network interface card NIC and then supplied to a hub 42. The multicast communication packet is one which contains an IP multicast address in a portion of an IP source address field and a MAC (Media Access Control) multicast address in a portion of a MAC source address field. The network interface card NIC is a PCI bus type and bus master type of PCI interface.

Figure 3:
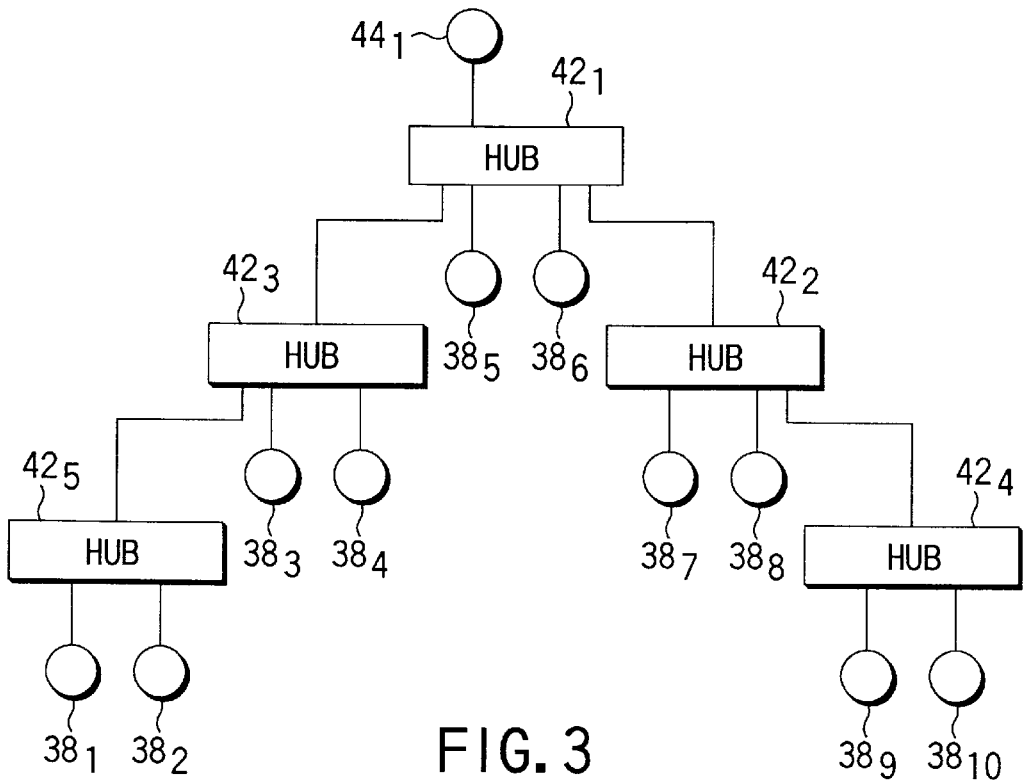
FIG. 3 shows a cascade-connected arrangement of the hubs.

To the hub 42 are also connected receiver terminals $44_1$ to $44_n$. Thus, a LAN is configured such that the transmitter terminals and the receiver terminals are linked to the central hub 42. For this reason, bi-directional data transmission becomes possible, allowing video, audio and control signals to be transmitted over the same cable. To install more terminals, the user simply connects additional terminals to the hub, which is very easy. Where the hub is short of ports, or the distance between the hub and a terminal or terminals is long, the user simply connects some hubs in cascade as shown in FIG. 3. Although FIG. 3 shows an arrangement of hubs on the transmit side in particular, the hubs on the receive side may be arranged likewise.

The 100VG Any-LAN is a 100-Mbps LAN that can use cables of audio quality (UTP-3: Unshielded Twisted Pair Cable category 3), particularly a LAN dedicated to half-duplex media. The hub (repeater) arbitrates among transmission accesses by terminals. Here, unshielded four-paired cables (4-UTP) were used as transmission media from the standpoint of ease of installation and cost. The hub employs an access control method, called demand priority, which arbitrates among transmission rights on a round robin basis. For this reason, packets are relayed from only one source node to their destination nodes rather than from all the nodes as with the Ethernet. In the present invention, however, since a multicast communication protocol is employed as described later, packets are relayed to all the nodes. The hub can be connected in cascade up to three stages. Two-level priority can be set up on each packet. The maximum delay time and bandwidth are guaranteed for traffic of a higher level of priority, which is useful for the video transmission.

The video encoder ENC in each terminal 38 employs a digital video compressing/expanding technique that is defined in ISO IS13818 and ITU-T Recommendation H.262 (hereinafter referred to as MPEG-2). The MPEG-2 classifies the performance of decoders by introducing concepts of profiles relating to classification of functions (differences in syntax) and levels relating to differences in amount (picture size and the like). The present invention uses the decoder of simple profile and main level (hereinafter referred to as SP@ML) so as to reduce delay times associated with video compression and expansion to 300 milliseconds or less.

Thus, the employment of the standard digital video compression/expansion technique defined by MPEG-2 allows a frame of video information of TV broadcasting quality to be transmitted in a fixed amount of information which is of the order of 6 Mbps. For this reason, video signals from multiple cameras can be transmitted multiplexed over the 100VG-Any LAN of 100 Mbps.

The video compression/expansion method is not limited the above-described one. Use may be made of any other method which, no matter how much the information amount may increase, can reduce delays with high quality maintained, for example, the motion JPEG method which compresses each frame individually and hence corresponds to the compression of only one frame defined in MPEG-2.

Like the transmitter terminals $38_1$ to $38_m$, the receiver terminals $44_1$ to $44_n$ each comprises a network interface card (hereinafter referred to as NIC) and a video decoder (hereinafter referred to as DEC). The video decoder DEC expands digital video information compressed by the video encoder ENC and converts it to analog video information.

Video information is distributed by the hub 42 to the receiver terminals $44_1$ to $44_n$ each of which receives only packets addressed to it through its interface card NIC. That is, the network interface card NIC receives all packets and processes only packets which, of digital video information packets multicast transmitted from the transmission sides, have desired IP source and IP multicast addresses. The received packets are fed into the corresponding video decoder DEC for conversion into analog video information containing audio information. The resulting video information is displayed on the corresponding monitor. Each of the monitors $46_1$, $46_2$, . . . is equipped with a loudspeaker and a remote controller $48_1$, $48_2$, . . . for controlling the panning, focusing, zooming, and the like of the corresponding TV camera that is shooting the picture being displayed. The remote controller may be made from dedicated switches or the graphical user interface (GUI) of the monitor.

In the above description, it is assumed that there are installed as many cameras as transmitter terminals. In the case where the cameras 30 are larger in number than the transmitter terminals 38, a pre-matrix circuit 56 may be connected between the video distributors 34 and the transmitter terminals 38 to selectively supply video signals to the transmitter terminals. For controlling the pre-matrix circuit 56, a control server 58 is connected to the hub 42.

Camera remote control signals are produced from the remote controllers 48 associated with the monitors 46. Video information from one camera may be distributed simultaneously to several monitors. Thus, a situation may occur in which remote control signals are produced from more than one remote controller for the one camera. For this reason, the system is configured such that remote control signals are transferred to the camera side through the control server 58. In order to prevent several remote controllers from controlling one camera simultaneously, until a previously accepted remote control request from a certain remote controller is serviced, the control server 58 overrides remote control requests from the others. Depending on the way the transmitter terminals and the cameras are coupled, methods of transferring remote control signals from the control server 58 or communication server 50 to the cameras include:

(i) direct transfer from the transmitter terminals 38 to the cameras 30;

(ii) direct transfer from the control server 58 to the cameras 30; and (iii) transfer through an additionally installed communication server 50 and a control channel 52.

As the control channel 52, use may be made of a low-speed public communication line (telephone network, ISDN) or dedicated line because the control signals contain little information amount.

Although the control server 58 and the communication server 50 are shown independent of each other, they may be integral with each other.

When remote control signals are supplied to the cameras and as a result the cameras are operated (for their angles, focusing, or the like), the results of operation will be reflected in video signals. The user or users thus can operate the remote controllers while checking the results of camera operations on the monitor screens. That is, the remote control system for each camera has a feedback loop. If, therefore, the time interval that elapses from the start of a camera remote control operation to the time that the results of the remote control operation are confirmed is long, then no smooth remote control operation will be achieved. The maximum delay time allowable for remote control camera operations by humans is about 300 milliseconds. Since the present invention uses the SP@ML codec for video compression and expansion, the delay time can be reduced to less than 300 milliseconds.

In the embodiment described so far, for TV broadcasting, an analog video signal is supplied from the video distributor 34 through the routing switcher 36 to the broadcasting device 40. If the digital video signals for the monitors is of broadcast quality, an analog video signal output from any one of the receiver terminals 44 can be used for broadcasting. By so doing, the routing switcher 36 becomes unnecessary.

As described above, in the present embodiment, analog video signals from several locations are converted to digital video signals with compression in the transmitter terminals, the receiver terminals coupled to the monitors and the transmitter terminals are connected in a LAN configuration by the hub, the digital video signals from all the transmitter terminals are distributed simultaneously to each receiver terminal through the use of a multicast communication protocol for one-to-many broadcast communication, each receiver terminal receives a desired one of the digital video signals, then expands and converts it to analog video information. The use of the 100VG Any-LAN (having a transmission rate of 100 Mbps) will produce an about fivehold increase in the rate-performance of the LAN over a CSMA/CD-based LAN having the same transmission rate. For terminal-to-terminal video distribution, the one-to-many multicast communication protocol is used, which checks an increase in the amount of information entered into the LAN as compared with the case of distributing packets corresponding in number to destinations through one-to-one unicast communication. That is, each transmitter terminal is not required to repeat a sending operation for each destination, reducing its work load and delays associated with processing.

Even if the need arises to install more receiver terminals, an increase in the amount of LAN information has little influence. There are only limitations imposed by the number of ports of a hub used (including cascade connection) and the distance for connection.

Even if video sources increase in number, each receiver terminal is only required to have the processing capability to accommodate one video source filtered by the NIC. This allows the work load on the receiver terminal to be reduced. It can therefore be expected that the receiver terminal will be available for concurrent processing of other application software and processing of decoding future video software.

The number of transmitter terminals to be connected can be determined by the amount of information that can be accommodated which is dependent on the transmission efficiency of each segment in the 100VG Any-LAN and the sum of amounts of information video signals have. The maximum number of transmitter terminals that are accommodated can be designed in advance. With the use of transmitter terminals the number of which is within that range, such delays as cause video disturbance will not occur.

In addition to the real-time video reproduction capability, each receiver terminal has a function of reproducing video at a later time by storing desired digital video information in memory.

In the transmitter terminals and the receiver terminals, one personal computer may be allocated for each video source or a plurality of video sources. In the example of FIG. 2, one personal computer is used for each video source.

Hereinafter, each component shown in FIG. 2 will be described in detail.

Multicast Protocol

The basis of data communications over LAN is peer-to-peer communications such that a certain terminal sends a packet to another terminal. If, therefore, there are one sender and multiple recipients (i.e., broadcast communication), the usual peer-to-peer communication has to increase the number of packets to be sent according to the number of recipients. To solve this problem, the TCP/IP protocol defines a broadcast address. With this broadcast address appended, one packet comes to have the broadcast function. Thus, even if receiver terminals increase in number, the amount of packets to be sent remains unchanged. The multicast protocol supports a broadcast protocol even in the case where the number of broadcast data is increased. As a result, even if many senders and multiple recipients exist on the LAN, the number of packets sent over the LAN corresponds, in principle, to the number of senders.

However, the multicast protocol has a drawback that senders' IP addresses are contained in the broadcast facility IP table. That is, each transmitter terminal has to receive again a packet sent by itself from the LAN. This leads to a difficulty in sending packets form the transmitter terminals.

To solve this problem, the receiver terminal 44 has a filtering function (implemented by hardware) built in. This will be described later in detail.

Figure 4:
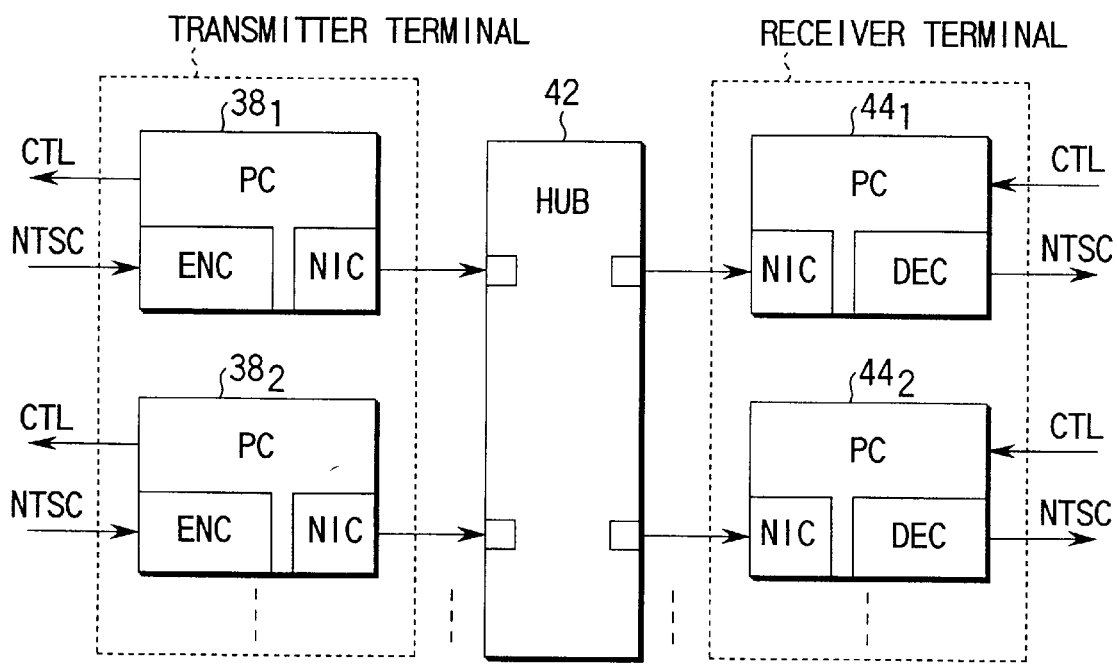
FIG. 4 shows in block diagram form the transmitter terminal, the receiver terminal, and the hub that connects both the terminals in a LAN configuration in the first embodiment.

FIG. 4 shows the transmitter terminal 38, the hub 42, and the receiver terminal 44. The transmitter terminal, which is made from a personal computer (PC), has the video encoder ENC and the network interface card NIC. NTSC indicates an analog video signal, and CTL indicates a control signal.

Figure 5:
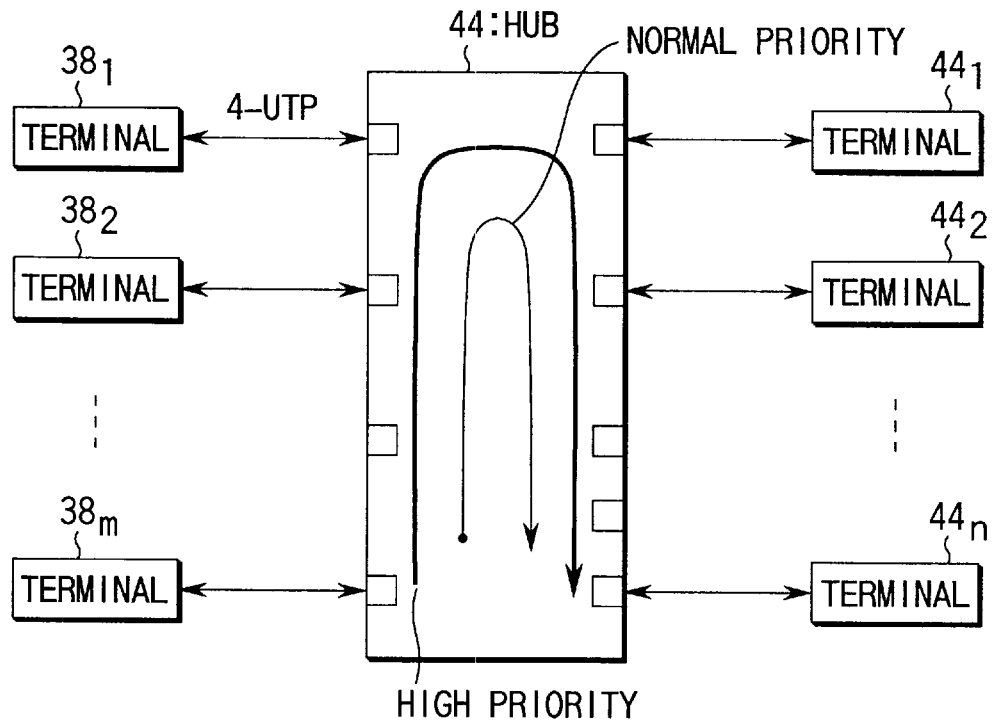
FIG. 5 is a diagram for use in explanation of the operation of the hub.

FIG. 5 shows the operation of the hub 42 that features the 100VG Any-LAN.

The 100VG Any-LAN hub 42 operates on a demand priority basis and assigns high priority to packets (digital video information) which are critical in time and normal priority to normal packets (for example, camera control signals). The hub checks packets for the presence of high priority on a round robin basis so as to transmit high priority packets on a preferential basis. After the high priority packets have been transmitted, the normal priority packets are transmitted. Thus, the LAN accepts the packets, one at a time, for transmission, forming a collisionless LAN. For this reason, the distribution capability can be designed in advance with only digital video information in mind, and the total amount of digital video information will not vary greatly with time. That is, such delays as disturb video will not occur at the time of distribution. For example, if digital video signals each of 6 Mbps are multiplexed over 100 Mbps, 12 pieces of video information will be distributed simultaneously on the assumption that the transmission efficiency is 75% at most (the transmission efficiency is said to be more than 90%).

The camera control signals contain little information amount. If, therefore, the LAN has room to accommodate more digital video information amount, there is no need of establishing priorities between digital video information and camera control signals. In this case, both the digital video information and the camera control signals may be assigned equal priority (normal priority or high priority).

Other digital communication computers may be connected to the LAN. In this case, if the computers are accommodated assigned low (normal) priority, digital video information will be handled on a preferential basis, so that the mixed use of video distribution and data communication can be made without any disadvantage.

The priority may be set up in advance on each NIC by hardware or may be specified to each NIC by applications.

Figure 6:
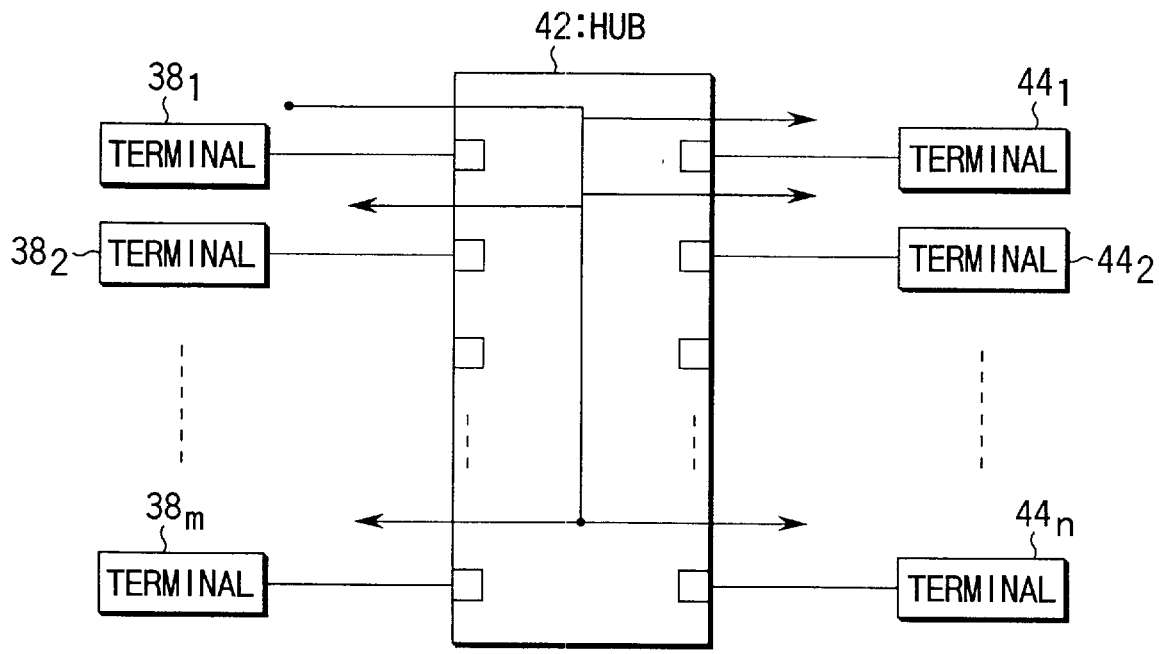
FIG. 6 is a diagram for use in explanation of the operation of the multicast communication.
Figure 7:
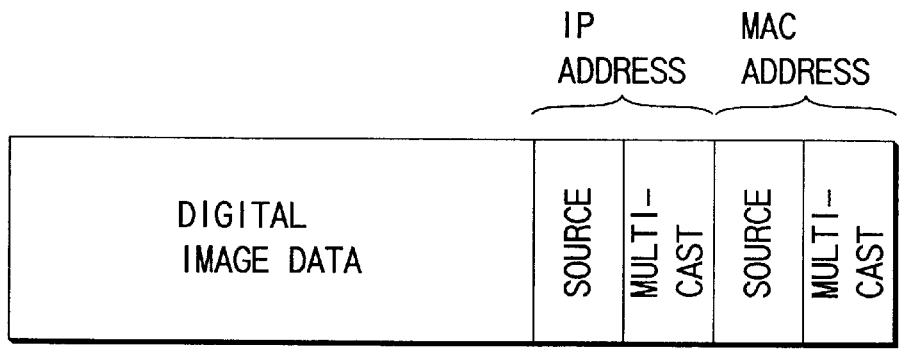
FIG. 7 shows the format of a multicast communication packet transmitted over the LAN.

In FIG. 6, there is illustrated a multicast communication. FIG. 7 shows a format of a multicast packet.

As described above, the multicast communication, which is a one-to-many distribution system, has an advantage of allowing the amount of information to the hub 42 in the LAN to remain substantially unchanged from that in the one-to-one unicast communication. To implement the multicast communication, a multicast address is defined in the TCP/IP communication protocol. The IP address contained in the header of a transmit packet is made up of a pair of a specific IP multicast address and an IP source address. Further, the MAC address is also made up of a pair of a specific MAC multicast address and a MAC source address. The multicast communication is distinct from the unicast communication only in that the transmitter terminal 38 is required to set specific values to these addresses.

Upon deciding that a packet sent by the terminal $38_1$ is a multicast communication packet on the basis of the address in that packet, the hub 42 sends multiple packets simultaneously through other ports while accepting that packet. The other terminals $38_2$ to $38_m$ and $44_1$ to $44_n$ can participate in the multicast communication at their discretion if the LAN consists of one segment as shown. That is, in the presence of the MAC multicast address or the IP multicast address in the header of a packet, each terminal simply performs a process of receiving that packet.

When the LAN is made up of multiple segments, a router (not shown) between each segment uses a procedure of inquiring of each terminal as to whether it takes part in the multicast communication and confirming a response from it. For a LAN segment to which no terminal taking part in the communication is connected, the router controls not to make the multicast communication to that segment. Thus, invalid communications are avoided.

Figure 8:
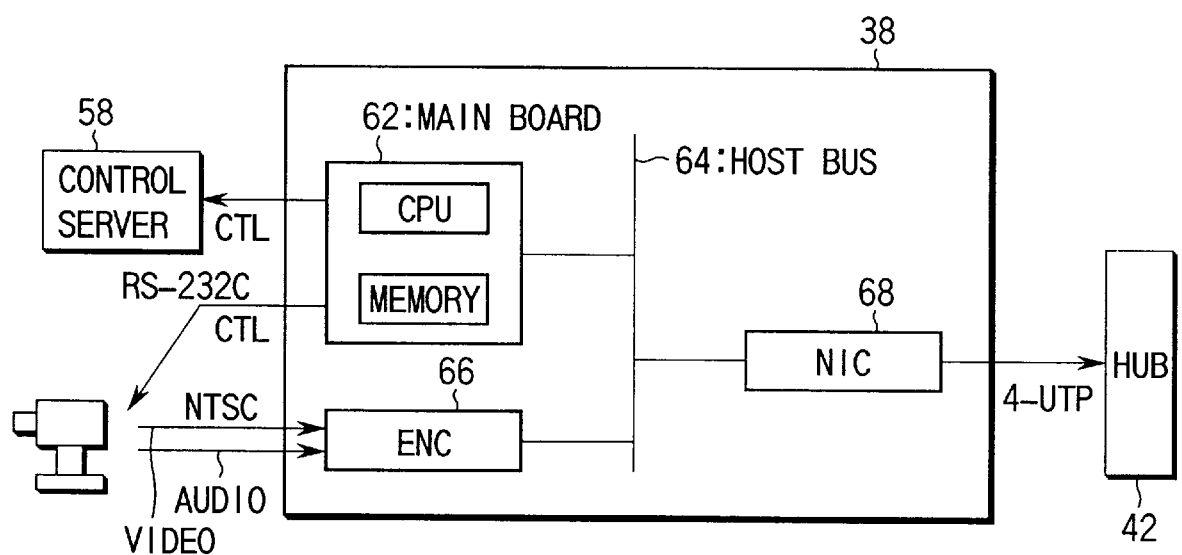
FIG. 8 shows an arrangement of the transmitter terminal.

FIG. 8 shows an arrangement of the transmitter terminal 38, which comprises a PC main board 62 comprised of a CPU and a memory, an encoder (ENC) 66 as an expansion board, and a network interface card (NIC) 68, which are all interconnected by a host bus 64. Camera control signals CTL may be supplied directly to the camera directly connected to the terminal 38 through the RS-232C port standard on the main board 62 or may be supplied through the control server 58, the communication server 50, and the control channel 52.

An analog video signal NTSC from the camera is fed directly or through the video channel 32 into the ENC 66 where it is subjected to digitization and compression and results in digital video information. The digital video information is stored temporarily in the memory on the main board and then sent to the NIC 68, which then sends the video information in the form of multicast communication packets to the LAN hub 42 over the 4-UTP cable. At this point, audio information is also sent combined with the video information in accordance with the MPEG2 protocol.

Under the present conditions, video is difficult to compress and expand by software. For this reason, the MPEG2 of TV broadcast quality is implemented by the ENC 66 of hardware configuration. For the ENC 66, a low-delay type video compression ENC to which the SP@ML-defined I/P frames are supplied is used. For the digital video information stream format, the fixed-format transport stream (TS) mode is used which provides recovery even in the event that an error occurs in mid-communication.

If the main profile and main level (MP@ML) standard defined in the MPEG2 were used, seconds of delay might be involved in outputting reproduced video because of the presence of a combination of I/P/B frames. That is, the B frame is a bidirectional prediction-coded picture, which, when used, causes great delays in compression and expansion. In the present invention, however, only a combination of I/P frames is present because of the use of the SP@ML.

Accordingly, with pictures of 30 frames per second, the present invention allows the reproduction delay to be about 270 milliseconds corresponding to eight frames.

Figure 9:
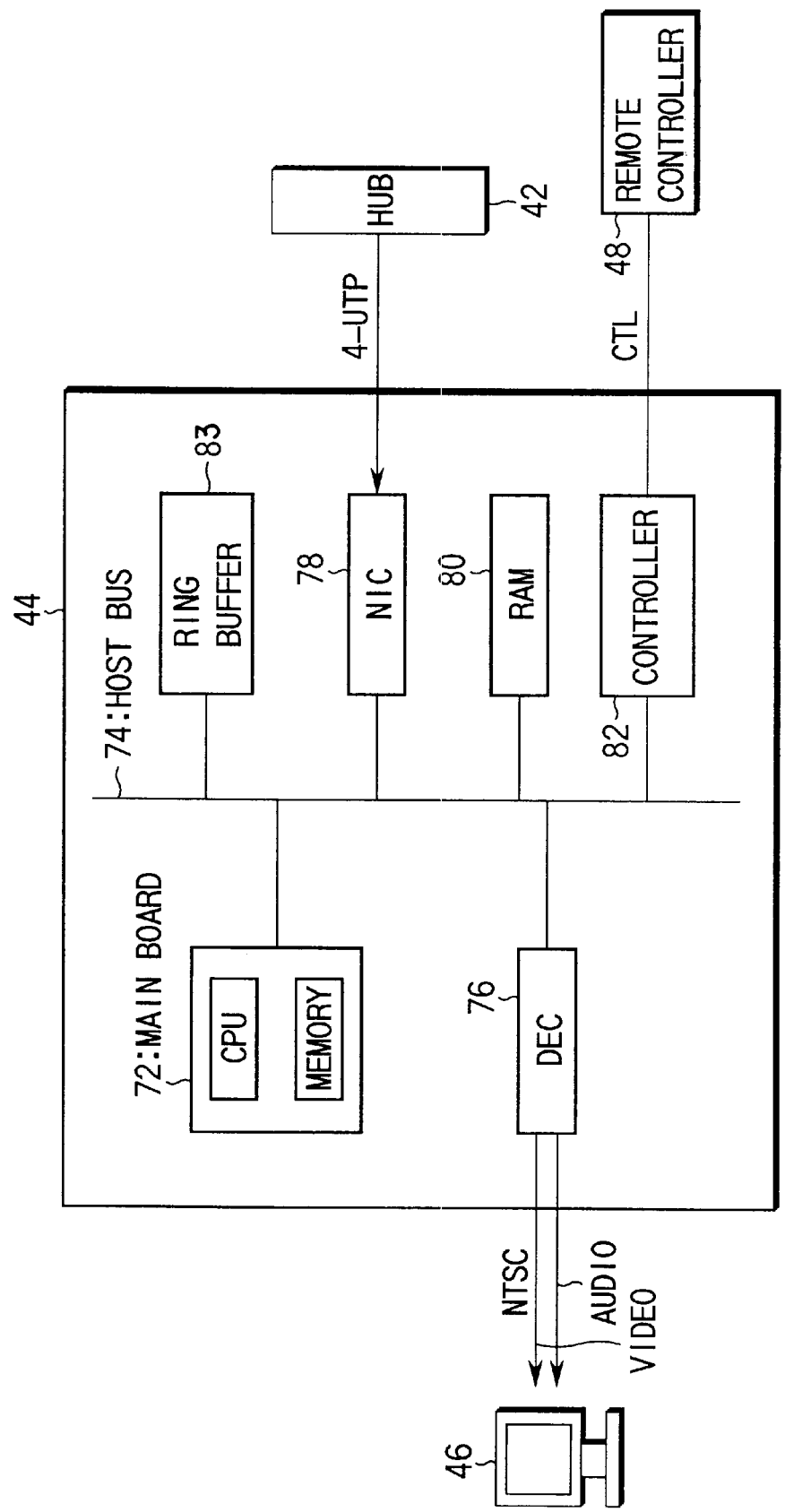
FIG. 9 shows an arrangement of the receiver terminal.

FIG. 9 shows an arrangement of the receiver terminal 44.

The receiver terminal comprises a PC main board 72 having a CPU and a memory, a decoder (DEC) 76 as an expansion board, a network interface card (NIC) 78, a RAM 80, a controller 82, and a ring buffer RAM 83, which are all interconnected by a host bus 74. To the DEC 76 is connected a monitor 46 or TV broadcasting device 40. A remote controller 48 is connected to the controller 82.

A receiving packet from the LAN hub 42 is supplied over 4-UTP cable to the NIC 78, stored in the memory on the main board 72 temporarily and then supplied to the DEC 76 where it is restored to the original analog video information NTSC. The analog video information is output to the broadcasting device 40 or the monitor 46. Audio information is processed in combination with the video information.

The ring buffer RAM 83, which is adapted to over-write and store digital video information cyclically for later playback and skipback, consists of a non-volatile semiconductor memory or a hard disk unit. Alternatively, the ring buffer may be part of the memory on the main board 72 (part of an on-board hard disk unit of the personal computer or the like).

When the cameras $30_1$ to $30_m$ are installed, a signal generator 84 (see FIG. 2) may be also installed, which usually generates KEEP-ALIVE signals periodically. When the occurrence of an unusual situation, such as an earthquake, is detected from a seismograph or monitor screens, the signal generator generates abnormality informing signals instead of the KEEP-ALIVE signals. These signals are send toward the LAN in the opposite direction to the camera control signals and received and processed by the communication server 50 for multicast communication as with video signals, or unicast communication in the case where a specific receiver terminal 44 performs the following processing. Digital video information is cyclically overwritten and stored on the ring buffer RAM 83 in the receiver terminal 44. Here, digital video information of 6 Mbps needs a storage capacity of about 50 MB for one minute of storage. Thus, the capacity of the ring buffer is selected to conform to a desired skipback time.

The cyclic overwriting is stopped when it is decided that the KEEP-ALIVE signals ceased or the abnormality informing signal was received. As a result, it follows that video information over a fixed length of time up to the present point of time is always retained, which will help observe suddenly occurring events such as earthquakes.

The ring buffer may be installed in the transmitter terminals as well.

Figure 10:
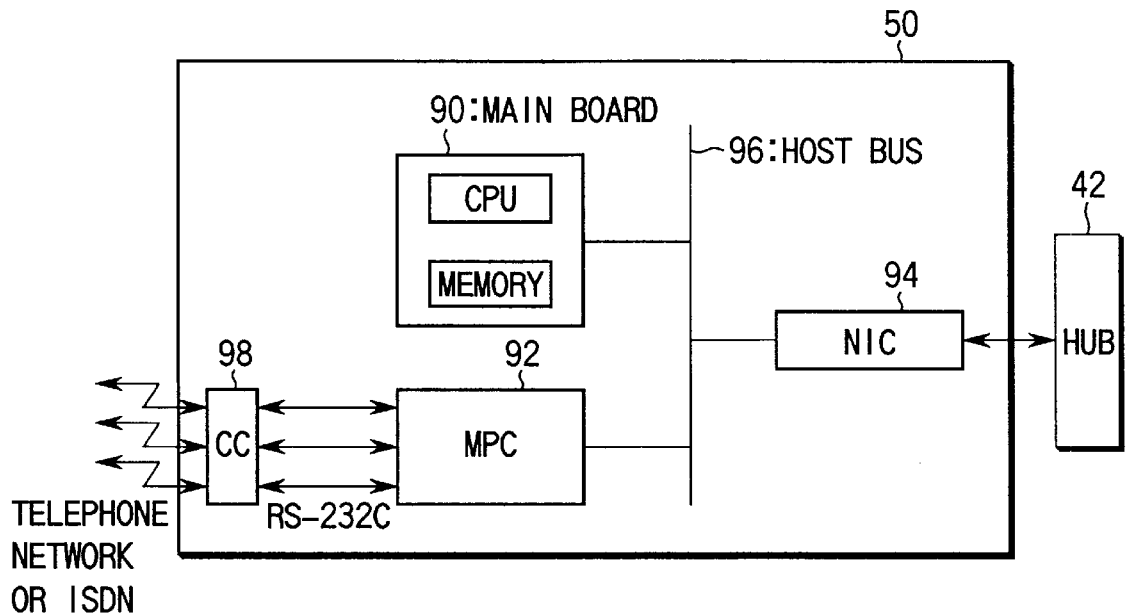
FIG. 10 shows an arrangement of the communication server.

FIG. 10 shows an arrangement of the communication server 50.

The communication server comprises a PC main board 90 comprised of a CPU and a memory, a multiport card (MPC) 92 as an expansion board, and a network interface card (NIC) 94, which are all interconnected by a host bus 96. The MPC 92 has multiple RS-232C (or RS-422) interfaces and is connected with a modem for telephone network or a communication controller CC 98 (terminal adapter) for ISDN.

Packets from the LAN hub 42 are received by the NIC 94, whereupon control signals are sent from the RS-232 (or RS-422) ports of the MPC 92 to the camera over the communication controller CC 98 and the control channel 50.

Figure 11:
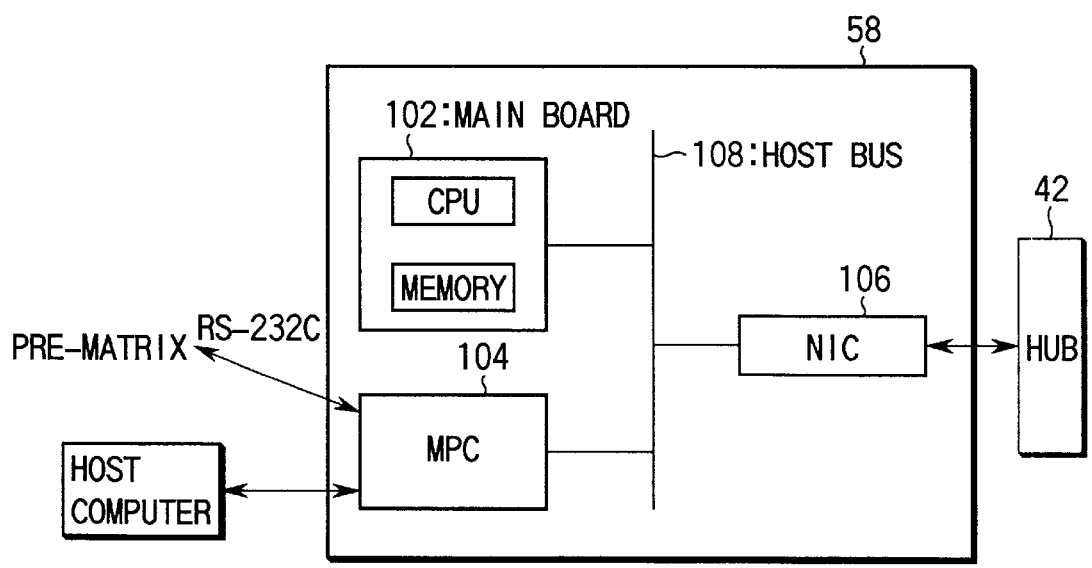
FIG. 11 shows an arrangement of the control server.

FIG. 11 shows an arrangement of the control server 58.

The control server comprises a PC main board 102 comprised of a CPU and a memory, a multiport card (MPC)

104 as an expansion board, and a network interface card (NIC) 106, which are all interconnected by a host bus 108. The acceptance of camera control signals and their transfer control over the communication server 50 are processed by software in the main board 102. The multiport card MPC 104 is used to connect with a host computer that controls the whole system when that computer is used. The pre-matrix device 56, if added, is connected with the multiport card MPC 104 which issues select commands for it.

Figure 12:
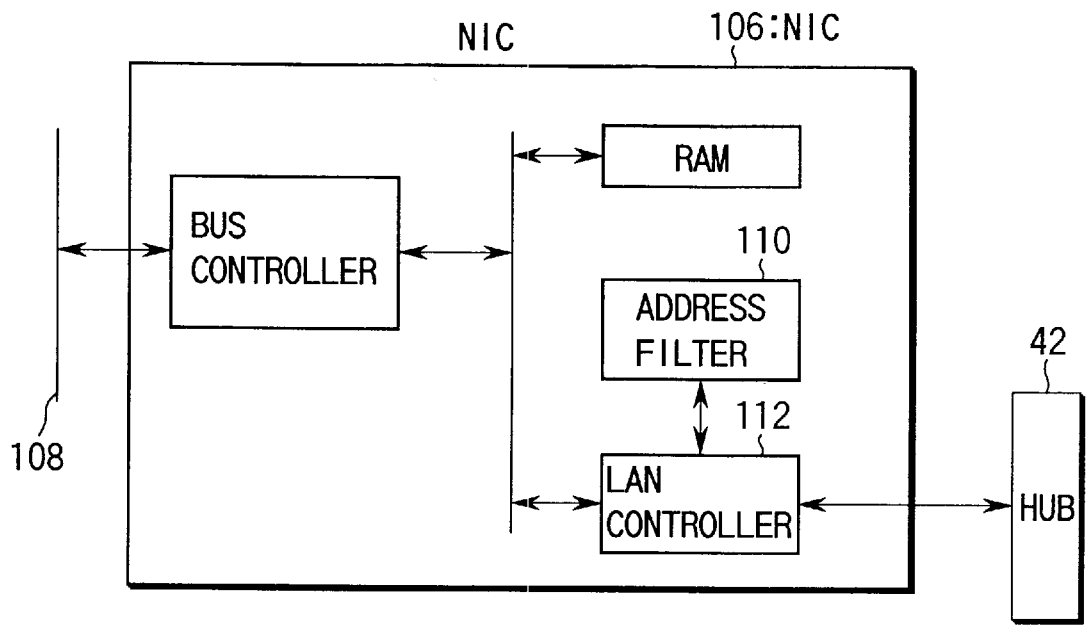
FIG. 12 is a block diagram of the network interface card.

FIG. 12 shows an arrangement of the NIC 106 of which address filtering facility is implemented in hardware. The NIC 106 is connected to the LAN hub 42 to perform communication processing for the 100VG Any-LAN and makes information communication with the memory on the main board 102 over the host bus 108 to and from RAM. For this information communication, a bus master-based fast data transfer technique is employed. That is, the NIC 106 itself makes direct memory access (DMA) transfer of the RAM information to and from the memory on the main board 102. For this reason, fast data transfer can be made with reduced CPU-dependent processing.

The address filtering in the NIC 106 refers to a facility of selecting valid packets from among packets which were originated from various transmitter terminals and received from the LAN hub 42 in a multicast communication fashion. This is intended to reduce subsequent work load of the CPU. The valid packets are ones that have the address of a desired transmitter terminal.

The NIC 106 is equipped with an address filter 110 implemented in hardware. The host computer sets an IP multicast address treated as valid and the IP source address of a desired transmitter terminal. Then, the address filter compares the IP multicast address and the IP source address in each received packet against the set IP multicast and IP source addresses, respectively, and discards packets for which the address comparisons indicate inequality.

If a value inherent in each of the ENCs of the respective transmitter terminals 38 is used as an IP multicast address, then IP multicast address comparison alone (as opposed to comparisons for both the IP multicast and IP source addresses) will suffice.

Figure 13:
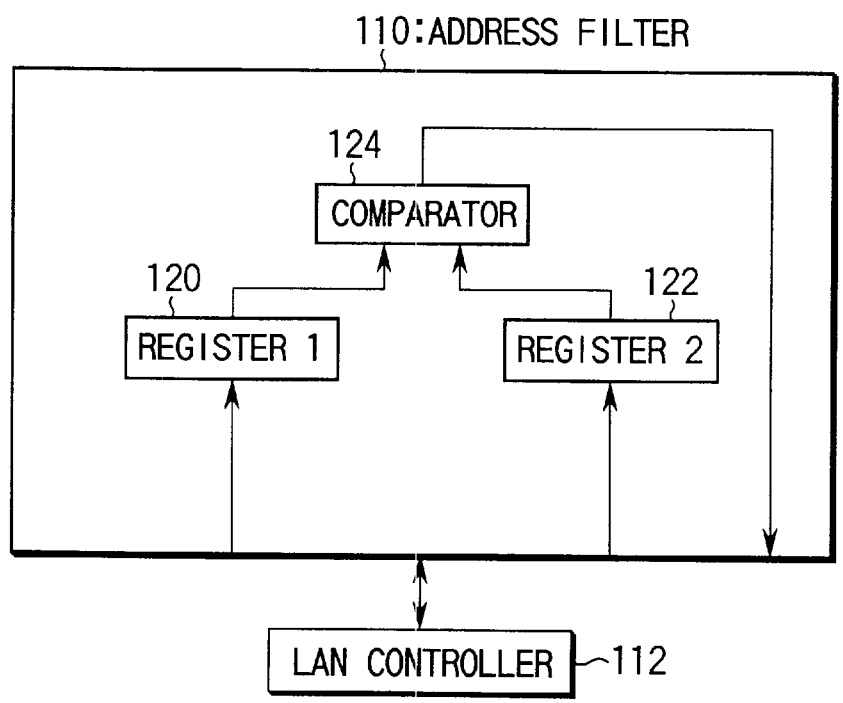
FIG. 13 is a block diagram of the address filter of FIG. 11.

FIG. 13 shows an arrangement of the address filter 110. The address filter 110 is connected to a LAN controller 112 and comprises a first register 120 which stores an IP multicast address and an IP source address that are specified by the host computer, a second register 122 which stores the IP multicast address and the IP source address that are retrieved from a received packet, and a comparator 124 which makes an address comparison for each address. The results of comparison are returned to the LAN controller 112. When the address comparisons indicate inequality, the LAN controller 112 discards that packet.

In the above description, the NIC is formed by a special hardware. However, it is possible to form the NIC by a CPU and a memory storing a firmware. In such a case, the address filtering can be achieved by the firmware.

According to the present invention, as described above, analog video signals from various places are converted by corresponding transmitter terminals to digital video information. The digital video information from each transmitter terminal is sent to all of receiver terminals over a LAN in accordance with a one-to-many multicast communication protocol. In each receiver terminal, desired digital video information is selected and reconverted to the original analog video information for display on a monitor screen.

With such a system configuration, the rate-performance of the LAN portion of a 100VG Any-LAN can be increased by a factor of about five over a CSMA/CD LAN of the same rate, 100 Mbps. The use of one-to-many multicast communication for distribution of video information to the LAN terminals allows the amount of information entered into the LAN to be reduced as compared with the one-to-one unicast communication in which a transmitter terminal sends a packet to each destination terminal. That is, the transmitter need not repeat a sending operation for each destination terminal, preventing work load on the terminal and delays associated with processing from increasing. Even if there arises the need of installing more receiver terminals within the same LAN segment, a possible increase in the amount of information will have little effect on the LAN. There are only limitations imposed by the number of ports associated with the hum used and connection distance.

Even if video sources increase in number, each receiver terminal is only required to have a processing capability to accommodate one video source selected by the NIC. In other words, less work load is required for the receiver terminal. Thus, it can be expected that extra capability, if any, is allocated to concurrent processing of any other application software or processing of decoding future video software.

Accordingly, a bidirectional digital video distribution system can be provided which has good expandability and does not cause real-time integrity required with moving pictures to suffer. The number of video transmitter terminals that operate simultaneously can be determined by the amount of information that the LAN can accommodate and the amount of video information. With all the simple configuration the system has, therefore, good expandability for transmitter and receiver terminals. In addition, the maximum number of transmitter terminals that can be connected to the LAN can be designed in advance. With the use of transmitter terminals within that range, pictures will not suffer from delays.

Moreover, a digital video distribution system can be provided in which less cost is required to implement and to change the place where the system is installed.

Furthermore, a bidirectional digital distribution system can be provided in which the address filter adapted to select desired packets from among packets transferred on a multicast basis is implemented by hardware, allowing the load on the CPU in each receiver terminal to be decreased and moving pictures to be transmitted over a LAN in real time.

Since no optical fiber is used, it is easy to interconnect terminals, allowing cost to install more terminals or to change the place where the system is installed to be reduced.

Further, since the ring buffer RAMs are connected to the terminals to constantly store video information over a fixed period of time up to the present time, each receiver terminal can reproduce video after some delay in addition to real-time video reproduction. This capability is useful in observing suddenly occurring events such as earthquakes.

The present invention is not limited to the embodiment described so far and may be practiced or modified in other ways. For example, the inventive system is applicable to other than the video distribution system in broadcasting stations. Modifications may be made such that (i) video sources are made of video servers (as opposed to cameras), (ii) the graphic user interface in each receiver terminal is altered, and (iii) signal generators and ring buffer RAMs are added. Such modifications will allow the inventive system to be supplied to the following:

(1) abnormality monitoring and recording system
(2) in-hotel CATV, VOD system or video checkout terminal
(3) KARAOKE BOX (4) remote teaching system or in-school class broadcasting system If the number of video sources connected is small or the transmission capacity can be taken so sufficiently that there is room to distribute more video information, the LAN used is not limited to the 100VG Any-LAN and may be a CSMA/CD LAN or ATM LAN. Conversely, a 1-gigabit CSMA/CD LAN which will be implemented in the future may be used.

When video signals from cameras placed at remote locations are relayed using microwave channels shared with fixed stations or mobile stations, there is a limit on the number of video signals to be relayed simultaneously. To relay as many video signals as possible, compression and expansion of video for monitoring purposes may be made by a straightforward technique defined in ITU Recommendation H.261 or MPEG-1. By so doing, video information amount becomes reduced, so that the control lines for the cameras can also be used for video signal transfer. Thus, it becomes possible to perform monitoring of the present invention through the use of the control lines and to transfer only video signals for broadcasting over video channels. In this case, the transmitter terminals 38 and the receiver terminals 44 each use broadcasting ENC and DEC. In this way, the need of using video channels in the microwave channels for monitoring purposes is eliminated. That is, the microwave channels can be used for broadcasting purposes only. Thus, an efficient utilization of the microwave channels shared with fixed stations or mobile stations can be achieved.

What we claim is:

1. A digital video distribution system for distributing analog video information of any one of a plurality of video sources to a plurality of video display units, comprising:

a plurality of first terminals adapted to be respectively connected to the plurality of video sources, each of the plurality of first terminals comprising an encoder for converting the analog video information supplied from the respective one of the plurality of video sources to compressed digital video information and a first interface for outputting the digital video information in the form of multicast protocol-based packets;

a local area network, connected to the plurality of first terminals, for receiving the digital video information from the plurality of first terminals; and a plurality of second terminals connected to the local area network and to the plurality of video display units, each of the second terminals comprising a second interface for receiving desired packets among the multicast protocol-based packets supplied from the local area network and a decoder for converting the desired packets received by the second interface to uncompressed analog video information, the resulting analog video information being displayed on the display units, the second interface comprising a hardware-implemented filter for selectively extracting desired packets in accordance with a multicast communications protocol, comprising a register into which a desired IP source address and a desired IP multicast address have been set by a CPU in the corresponding second terminal and a comparator for comparing an IP source address and an IP multicast address contained in a received packet with the desired IP source address and the desired IP multicast address set in the register.

2. The system according to claim 1, in which the local area network comprises an IEEE 802.12 demand priority local area network in which the first terminals and the second terminals are connected to each other through a hub.

3. The system according to claim 1, in which the encoder in each of the first terminals is an MPEG-2 SP@ML encoder and the decoder in each of the second terminals is an MPEG-2 SP@ML decoder.

4. The system according to claim 1, in which the first terminals output packets each having an IP address field containing an IP source address and an IP multicast address and a MAC address field containing a MAC source address and a MAC multicast address.

5. The system according to claim 1, in which the second terminals have a ring buffer RAM on which digital video information from the first terminals is overwritten cyclically and means for stopping overwriting on the ring buffer RAM at a specific time, and the second terminal displays information retained on the ring buffer RAM instead of video information from the local area network after the overwriting on the ring buffer RAM has been stopped.

6. The system according to claim 5, in which the overwriting stopping means includes means for detecting the occurrence of an earthquake and, upon detecting the occurrence of an earthquake, stops overwriting on the ring buffer RAM.

7. The system according to claim 1, in which each of the second terminals is equipped with a remote controller for controlling one of the plurality of video sources that is outputting analog video information displayed on the display unit, control signals from the remote controller being supplied to the video source over the local area network.

8. The system according to claim 7, in which each of the video sources comprises a television camera equipped with electrically-operated zooming/focusing mechanisms, and a universal head on which the television camera is mounted.

9. The system according to claim 7, which further comprises a control server for controlling the supply of control signals from the second terminals to the video sources in such a way as to, until control signals from a second terminal accepted earlier are ceased, stop the supply of control signals from the other second terminals to video sources.

10. The system according to claim 1, which further comprises video distributors connected between the video sources and the first terminals, each of the video distributors distributing video information from a corresponding video source to its two outputs one of which is connected to a corresponding first terminal and a switch matrix connected to the other of the two outputs of each video distributor, the switch matrix selectively outputting video information of one of the video sources to broadcasting device.

11. The system according to claim 1, in which one of the second terminals outputs its output signal to broadcasting device.

12. The system according to claim 1, wherein the local area network comprises an IEEE 802.12 demand priority local area network in which the first terminals and the second terminals are connected to each other through a hub.

13. The system according to claim 12, wherein the first terminals output packets each having an IP address field containing an IP source address and an IP multicast address and a MAC address field containing a MAC source address and a MAC multicast address.

14. The system according to claim 13, in which each of the second terminals is equipped with a remote controller for controlling one of the plurality of video sources that is outputting analog video information displayed on the display unit, control signals from the remote controller being supplied to the video source over the local area network.

15. A digital video distribution system for distributing analog video information of any one of a plurality of video sources to a plurality of video display units, comprising:

a plurality of first terminals adapted to be respectively connected to the plurality of video sources, each of the plurality of first terminals comprising an encoder for converting the analog video information supplied from the respective one of the plurality of video sources to compressed digital video information and a first interface for outputting the digital video information in the form of multicast protocol-based packets;

a local area network, connected to the plurality of first terminals, for receiving the digital video information from the plurality of first terminals; and a plurality of second terminals connected to the local area network and to the plurality of video display units, each of the second terminals comprising a second interface for receiving desired packets among the multicast protocol-based packets supplied from the local area network and a decoder for converting the desired packets received by the second interface to uncompressed analog video information, the resulting analog video information being displayed on the display units, the second terminals having a ring buffer RAM on which digital video information from the first terminals is overwritten cyclically and means for stopping overwriting on the ring buffer RAM at a specific time, wherein the second terminals display information retained on the ring buffer RAM instead of video information from the local area network after the overwriting on the ring buffer RAM has been stopped.

16. The system according to claim 1, in which the local area network comprises an IEEE 802.12 demand priority local area network in which the first terminals and the second terminals are connected to each other through a hub.

17. The system according to claim 15, in which the encoder in each of the first terminals is an MPEG-2 SP@ML encoder and the decoder in each of the second terminals is an MPEG-2 SP@ML decoder.

18. The system according to claim 15, in which the first terminals output packets each having an IP address field containing an IP source address and an IP multicast address and a MAC address field containing a MAC source address and a MAC multicast address.

19. The system according to claim 15, in which each of the second terminals has a hardware-implemented filter for selectively extracting desired packets in accordance with a multicast communication protocol.

20. The system according to claim 19, in which the hardware-implemented filter includes a register into which a desired IP source address and an IP multicast address have been set by a CPU in the corresponding second terminal and a comparator for comparing an IP source address and an IP multicast address contained in a received packet with the IP source address and the IP multicast address set in the register.

21. The system according to claim 15, in which the overwriting stopping means includes means for detecting the occurrence of an earthquake and, upon detecting the occurrence of an earthquake, stops overwriting on the ring buffer RAM.

22. The system according to claim 15, in which each of the second terminals is equipped with a remote controller for controlling one of the plurality of video sources that is outputting analog video information displayed on the display unit, control signals from the remote controller being supplied to the video source over the local area network.

23. The system according to claim 15, in which each of the video sources comprises a television camera equipped with electrically-operated zooming/focusing mechanisms, and a universal head on which the television camera is mounted.

24. The system according to claim 15, which further comprises a control server for controlling the supply of control signals from the second terminals to the video sources in such a way as to, until control signals from a second terminal accepted earlier are ceased, stop the supply of control signals from the other second terminals to video sources.

25. The system according to claim 15, which further comprises video distributors connected between the video sources and the first terminals, each of the video distributors distributing video information from a corresponding video source to its two outputs one of which is connected to a corresponding first terminal and a switch matrix connected to the other of the two outputs of each video distributor, the switch matrix selectively outputting video information of one of the video sources to a broadcasting device.

26. The system according to claim 15, in which one of the second terminals outputs its output signal to a broadcasting device.

27. The system according to claim 19, wherein the local area network comprises an IEEE 802.12 demand priority local area network in which the first terminals and the second terminals are connected to each other through a hub.

28. The system according to claim 27, wherein the first terminals output packets each having an IP address field containing an IP source address and an IP multicast address and a MAC address field containing a MAC source address and a MAC multicast address.

29. The system according to claim 28, in which each of the second terminals is equipped with a remote controller for controlling one of the plurality of video sources that is outputting analog video information displayed on the display unit, control signals from the remote controller being supplied to the video source over the local area network.

30. A digital video distribution system for distributing analog video information of any one of a plurality of video sources to a plurality of video display units, comprising:

a plurality of first terminals adapted to be respectively connected to the plurality of video sources, each of the plurality of first terminals comprising an encoder for converting the analog video information supplied from the respective one of the plurality of video sources to compressed digital video information and a first interface for outputting the digital video information in the form of multicast protocol-based packets;

a local area network, connected to the plurality of first terminals, for receiving the digital video information from the plurality of first terminals; a plurality of second terminals connected to the local area network and to the plurality of video display units, each of the second terminals comprising a second interface for receiving desired packets among the multicast protocol-based packets supplied from the local area network and a decoder for converting the desired packets received by the second interface to uncompressed analog video information, the resulting analog video information being displayed on the display units; and video distributors connected between the video sources and the first terminals, each of the video distributors distributing video information from a corresponding video source to its two outputs one of which is connected to a corresponding first terminal and a switch matrix connected to the other of the two outputs of each video distributor, the switch matrix selectively outputting video information of one of the video sources to a broadcasting device.

31. The system according to claim 30, in which the local area network comprises an IEEE 802.12 demand priority local area network in which the first terminals and the second terminals are connected to each other through a hub.

32. The system according to claim 30, in which the encoder in each of the first terminals is an MPEG-2 SP@ML encoder and the decoder in each of the second terminals is an MPEG-2 SP@ML decoder.

33. The system according to claim 30, in which the first terminals output packets each having an IP address field containing an IP source address and an IP multicast address and a MAC address field containing a MAC source address and a MAC multicast address.

34. The system according to claim 30, in which each of the second terminals has a hardware-implemented filter for selectively extracting desired packets in accordance with a multicast communication protocol.

35. The system according to claim 34, in which the hardware-implemented filter includes a register into which a desired IP source address and an IP multicast address have been set by a CPU in the corresponding second terminal and a comparator for comparing an IP source address and an IP multicast address contained in a received packet with the IP source address and the IP multicast address set in the register.

36. The system according to claim 30, in which the second terminals have a ring buffer RAM on which digital video information from the first terminals is overwritten cyclically and means for stopping overwriting on the ring buffer RAM at a specific time, and the second terminal displays information retained on the ring buffer RAM instead of video information from the local area network after the overwriting on the ring buffer RAM has been stopped.

37. The system according to claim 36, in which the overwriting stopping means includes means for detecting the occurrence of an earthquake and, upon detecting the occurrence of an earthquake, stops overwriting on the ring buffer RAM.

38. The system according to claim 30, in which each of the second terminals is equipped with a remote controller for controlling one of the plurality of video sources that is outputting analog video information displayed on the display unit, control signals from the remote controller being supplied to the video source over the local area network.

39. The system according to claim 38, in which each of the video sources comprises a television camera equipped with electrically-operated zooming/focusing mechanisms, and a universal head on which the television camera is mounted.

40. The system according to claim 38, which further comprises a control server for controlling the supply of control signals from the second terminals to the video sources in such a way as to, until control signals from a second terminal accepted earlier are ceased, stop the supply of control signals from the other second terminals to video sources.

41. The system according to claim 30, in which one of the second terminals outputs its output signal to a broadcasting device.

42. The system according to claim 34, wherein the local area network comprises an IEEE 802.12 demand priority local area network in which the first terminals and the second terminals are connected to each other through a hub.

43. The system according to claim 42, wherein the first terminals output packets each having an IP address field containing an IP source address and an IP multicast address and a MAC address field containing a MAC source address and a MAC multicast address.

44. The system according to claim 43, in which each of the second terminals is equipped with a remote controller for controlling one of the plurality of video sources that is outputting analog video information displayed on the display unit, control signals from the remote controller being supplied to the video source over the local area network.

* * * * *